United States Patent [19]

Aysta

[11] 4,010,994
[45] Mar. 8, 1977

[54] CONNECTOR ENCAPSULATING HOUSING
[75] Inventor: James E. Aysta, Stillwater, Minn.
[73] Assignee: Minnesota Mining and Manufacturing Company, St. Paul, Minn.
[22] Filed: June 12, 1975
[21] Appl. No.: 586,502

Related U.S. Application Data
[62] Division of Ser. No. 400,950, Sept. 26, 1973.
[52] U.S. Cl. .................................................. 339/36
[51] Int. Cl.² ...................................... H01R 13/44
[58] Field of Search .............. 339/36, 44, 97, 98, 339/99, 101, 103, 107; 174/76

[56] References Cited
UNITED STATES PATENTS 3,622,942  11/1971  Rynk ................................ 339/107
3,897,129  7/1975  Farrar ........................... 339/99 R X

*Primary Examiner*—Joseph H. McGlynn
*Attorney, Agent, or Firm*—Alexander, Sell, Stedlt & DeLaHunt

[57] ABSTRACT

A housing used for encapsulating an electrical connector having internal passageways extending between opposite ends. A socket in the housing which conforms to the connector is filled with a quantity of viscous electrically insulating water restricting encapsulating material, and the connector is pressed endways into the socket via levers on the housing so that the encapsulating material is forced into and extruded through the passageways to completely fill the interstices in the connector.

7 Claims, 6 Drawing Figures

CONNECTOR ENCAPSULATING HOUSING

This is a division of application Ser. No. 400,950 filed Sept. 26, 1973.

BACKGROUND OF THE INVENTION

This invention relates to housings for the encapsulation of electrical connectors, and in one aspect to housings used in encapsulating telephone circuit wire connectors in a viscous encapsulating material.

The plurality of connectors used to interconnect wires of a telephone circuit such as a pressurized or non-pressurized splice case, or a telephone pedestal, must be protected from corrosion caused by moisture which may enter the splice case or pedestal. This protection cannot be conveniently provided by encapsulation in a self-curing encapsulating material within an enclosure as is taught in U.S. Pat. Nos. 2,862,042, 2,908,744, 2,967,795 and 3,419,669 for use in splicing underground cables or by encapsulation in a removable encapsulating material within an enclosure as is taught in U.S. Pat. No. 3,836,694, because of the large size of these enclosures relative to the normal size of splice cases or pedestals.

Such connectors have been individually encapsulated in a viscous encapsulating material by placing a wired connector into a flexible bag partially filled with encapsulating material, working the encapsulating material around the connector, and securing the open end of the bag about the wires leading to the connector which are formed into a bundle. This system, however, requires a large amount of the encapsulating material relative to the volume of the connector, and sufficient length in each of the spliced wires to form a wire bundle. The resulting encapsulated connector is large compared to the size of the connector so that it fills valuable space within the splice case or pedestal. The proper distribution of the encapsulating material around the connector is dependent on the operator's skill. Also, simply surrounding the connector with the encapsulating material does not insure that its interstices will be completely filled with the encapsulating material which, if present, will restrict arcing within the connector.

While inserting encapsulating material in the connector either at manufacture (where the material is an insulating grease) and/or during assembly thereof has been suggested, this process is messy and whether or not the interstices are completely filled is largely dependent on the care taken by the workman.

SUMMARY OF THE INVENTION

According to the present invention there is provided a housing which affords a simple, space saving and dependable method for individually encapsulating connectors of the type having internal passageways extending between opposite ends. The housing can be used to force encapsulating material into and through the passageways of the connector so that the passageways of an encapsulated connector are completely filled. This both prevents moisture from reaching the wires and contacts in the connector, and increases the dielectric strength between contacts in the connector so that arcing is restricted.

The amount of expensive encapsulating material required to encapsulate a connector in a housing according to the present invention is small compared to the amount required to encapsulate the connector in a grease bag (e.g. the same connector may be encapsulated in 20 grams of encapsulating material with the present invention compared to about 110 grams of encapsulating material when a grease bag is used). Also, the size of the housing in which the connector is encapsulated is only slightly larger then the connector itself which conserves space in a splice case or pedestal.

The housing according to the present invention is useful for encapsulating connectors having upstanding side walls extending between their ends (i.e. "upstanding" as used herein means having side walls that all extend at right angles to a common plane in the manner of the side walls of a piston). The housing has a socket with an unrestricted open end. The socket is adapted to conform to the side walls of the connector so that the inner surface of the socket adjacent the open end provides a close sliding fit around the walls of the connector (i.e. about 0.005 to 0.010 inch clearance although small surface grooves in the walls are permissible). A quantity of viscous dielectric water insoluble encapsulating material may be placed within the socket, the quantity being sufficient to fill the socket including the passageways of the connector after the connector is positioned a predetermined distance within the socket. The connector may then be pressed endways into the open end of the socket with sufficient pressure to force the encapsulating material through the internal passageways of the connector by virtue of the connector acting as a piston via opposed levers hingedly mounted adjacent the open end of the socket which may be manually operated and provide a mechanical advantage for driving the connector into the encapsulating material in the socket. The encapsulating material will move through and completely fill the passageways as they provide less resistance to its movement than the space between the inner surface of the socket and the connector walls.

The method requires the use of only slightly more encapsulating material than is required to fill the interstices of the connector. Both self-curing and non-curing encapsulating materials may be used. When a non-curing encapsulating material is used, an encapsulated connector is easily re-entered by simply pulling the connector from the socket. When the desired change has been made the connector can again be sealed by simply placing encapsulating material in the socket and re-inserting the connector.

Encapsulating materials which have been found particularly suitable include those having a high dielectric strength and thixotropic properties, with a static viscosity in about the one to one and one half million centipoise range, and a penetrometer reading in the range of 200 to 300. Examples include a silicone grease sold under the designation DC-2 by Dow Corning, and a grease sold under the designation DSG Sealant Grease by Minnesota Mining and Manufacturing Company.

BRIEF DESCRIPTION OF THE DRAWING

The invention will be further described with reference to the accompanying drawing wherein like numbers refer to like parts in the several views, and wherein.

DESCRIPTION OF THE PREFERRED EMBODIMENTS

Figure 1:
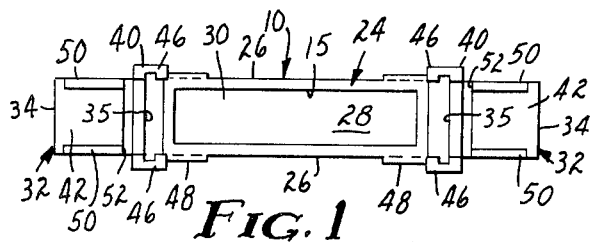
FIG. 1 is a plan view of a first embodiment of a connector encapsulating housing according to the present invention.
Figure 3:
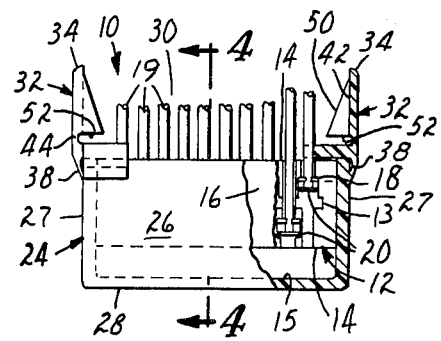
FIG. 3 is an elevational view, partially in section, of the housing of FIG. 1 illustrated with the connector of FIG. 2 sectioned and positioned within the housing so as to be encapsulated.
Figure 2:
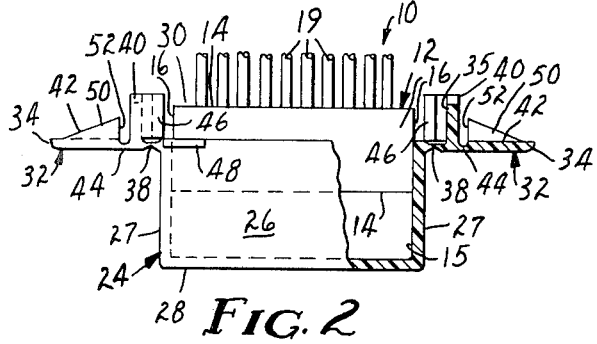
FIG. 2 is an elevational view, partially in section, of the housing of FIG. 1 illustrated with a connector partially inserted therein.
Figure 4:
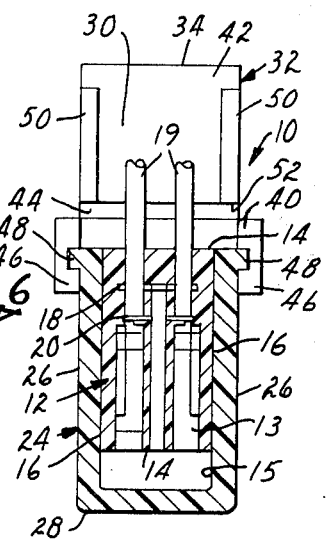
FIG. 4 is an enlarged sectional view taken approximately along the lines 4—4 of FIG. 3.

Referring now to FIGS. 1 through 4 there is shown a first embodiment of a housing according to the present invention, generally designated by the numeral 10. The housing 10 is adapted for use in encapsulating a connector 12 (FIGS. 2, 3 and 4) having internal passageways 13 communicating between its ends 14 by pressing the connector 12 endways into a close fitting socket 15 in the housing 10 filled with a viscous dielectric water restricting encapsulating material via a pair of opposed levers 32. As the connector 12 is pressed into the socket 15 the encapsulating material is forced into and extruded through the passageways 13 to fill the interstices of the connector 12 (FIGS. 3 and 4).

The connector 12 is of the type disclosed in U.S. Pat. No. 3,708,779, the disclosure whereof is incorporated by reference herein. Briefly, the connector 12 is generally rectangular having upstanding side walls 16 extending between its opposite ends 14. The connector 12 has separable insulative body portions defining (when assembled) a plurality of the internal wire receiving passageways 13 which extend between its ends 14. A plurality of conductive contact elements 18 which are slotted to define resilient wire receiving fingers are mounted in one of the body portions with the slots aligned with the passageways. The lengths of wires 19 to be electrically interconnected are positioned within the portions of the passageways 13 defined in one of the body portions, and the connector 12 is assembled to resiliently engage the fingers of the contact elements 18 with the wires 19 to electrically interconnect them in a predetermined pattern. The connector also includes cutting blades 20 which, as the connector 12 is assembled, sever each length of wire 19 adjacent the contact element 18 engaging it so that the severed wire end may be pulled from the connector 12. The cutting blades 20 are positioned so that the electrically interconnected wires 19 extend from only one end 14 of the connector 12.

The housing 10 includes rectangularly disposed side walls 26, end walls 27, and a bottom wall 28, the inner surfaces of which define the socket 15 which has an unrestricted elongate rectangular open end 30. The inner surfaces of the side and end walls 26 and 27 provide inner side surfaces for the socket 15 which conform to the side walls 16 of the connector 12 (i.e. provide a sliding fit with 0.005 to 0.010 inch clearance between the side walls 16 of the connector 12 and the side and end walls 26 and 27) to prevent movement of a significant amount of the encapsulating material therebetween, since the encapsulating material is more easily extruded through the passageways 13 as the connector 12 is pressed into the socket 15.

The housing 10 also includes the pair of levers 32 which aid in manually pressing a connector into the socket 15 and provide means for latching it therein. The levers 32 are hingedly mounted in opposed relationship at the open end 30 of the socket, each for movement about an axis across the edge of the end 27 to which the lever 32 is attached. Each lever 32 has a distal end wall 34 adapted for manual engagement, and a planar driving surface 35 adjacent the open end 30 of the socket 15. The levers are pivotable from a first position (FIGS. 1 and 2) spaced so that the open end 30 of the socket 15 is unrestricted to permit a connector 12 to be partially inserted therein, toward a second position so that the driving surfaces 35 will engage the exposed end 14 of the connector 12 received in the socket 15 along opposite edges and will drive the connector 12 fully within the socket 15. The opposed levers 32 may be conveniently squeezed toward each other by the user, and the distance from the axis to the driving surface 35 of each lever 32 is relatively short compared to the length of the lever 32 from the axis to its distal end 34 so that the levers 32 provide a mechanical advantage to facilitate pressing a connector into the socket 15.

The housing 10 is a one piece molding of a polymeric material, preferably polypropylene. The axis of rotation of each lever 32 is provided by a first thin hinge section 38 of the molded material between the lever 32 and the end walls 27 (best seen in FIG. 2). The thin hinge section 38 strain hardens during deformation and provides a relatively strong fracture resistant and flexible hinge between the lever 32 and one of the end walls 27.

Each lever 32 comprises a first lever portion 40 and a second lever portion 42 interconnected by a second thin hinge section 44 similar and parallel to the first thin hinge section 38. The first lever portion 40 provides the driving surface 35 and has an opposed pair of hooks 46 extending along opposite edges of the driving surface 35 from the axis of rotation which project at right angles to the driving surface 35 toward the open end 30 of the socket 15. The opposed ends of the hooks 46 on each lever 32 are adapted to cam over a pair of keepers 48 projecting outwardly from the opposite surfaces of the sides 26 adjacent the open end 30, and thus latch the first lever portion 40 in its second position.

Each second lever portion 42 has a pair of triangular projections 50 having end surfaces 52 adjacent the surface of the first lever portion 40 opposite the driving surface 35. These end surfaces 52 abut and press the adjacent first lever portion 40 toward its second position as the second lever portions 42 are squeezed toward each other to drive a connector into the socket 15. After the first lever portion 40 is latched in its second position the second hinge portion 44 provides a convenient line to facilitate tearing or cutting the second lever portion 42 away, should this be desired.

Figure 5:
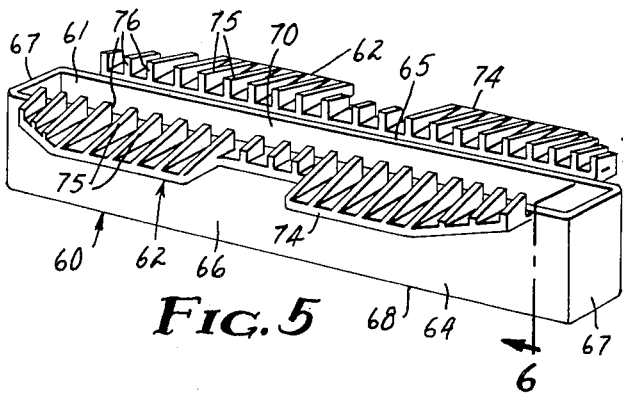
FIG. 5 is a perspective view of a second embodiment of a connector encapsulating housing according to the present invention.
Figure 6:
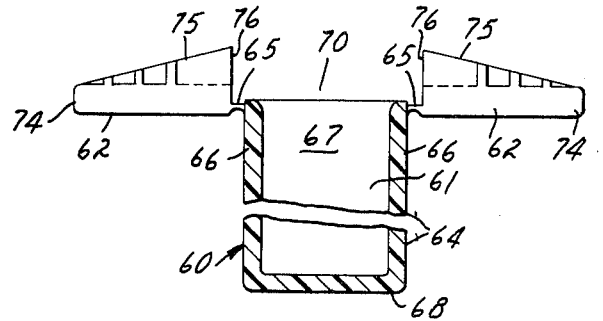
FIG. 6 is an enlarged fragmentary sectional view taken approximately along the lines 6—6 of FIG. 5.

Referring now to FIGS. 5 and 6 there is shown a second embodiment of a housing according to the present invention generally designated by the numeral 60. Like the housing 10, the housing 60 is also adapted for use in encapsulating a connector having internal passageways communicating between its ends by pressing the connector endways into a close fitting socket 61 filled with an encapsulating material. The housing 60 is particularly adapted for encapsulating connectors in which the length of their side walls greatly exceeds their width, because it includes a pair of levers 62 to aid in pressing a connector into the socket 61 which are adapted to contact the exposed end of a connector along its longest edges.

Like the housing 10, the housing 60 includes rectangularly disposed side walls 66, end walls 67, and a bottom wall 68, the inner surfaces of which define the socket 61 which has an unrestricted elongate rectangular open end 70. The inner surfaces of the side and end walls 66 and 67 provide inner side surfaces for the socket 61 which conform to the side walls of a connector for which the device is adapted to effectively prevent movement of the encapsulating material therebetween and force it through the passageways of the connector as the connector is pressed into the socket 61.

The housing 60 including the levers 62 is a one piece molding preferably of polypropylene. The axis of rotation for each lever 62 is provided by a thin hinge section 65 of polypropylene between the lever 62 and one of the side walls 66 adjacent the open end 70 of the socket 61. The levers 62 are mounted in opposed relationship. Each lever 62 includes a planar member, the distal end 74 of which is adapted for manual engagement. A plurality of spaced triangular bosses 75 project from the planar member toward the open end 70 of the socket 61. Each boss 75 has an end surface in a common plane so that the end surfaces of each lever 62 define a driving surface 76 adjacent the open end 70 of the socket 61. The levers are movable from a first position with the driving surfaces 76 spaced so that the open end 70 of the socket 61 is unrestricted allowing a connector to be partially inserted therein, toward a second position so that the driving surface 76 will engage the exposed end of the connector received in the socket along opposite edges and will drive it fully within the socket 61. The distance from the axis to the driving surface 76 of each lever is relatively short compared to the length of the lever from the axis to its distal end 74 so that the lever 62 provides mechanical advantage to facilitate pressing the connector into the socket 61. The central portions of the opposed levers 62 are relieved so that a user will tend to squeeze the levers 62 along four sections of maximum lever length, thereby tending to more evenly distribute the applied force along the length of a connector to drive it into the socket 61 without binding.

I claim:

1. A housing for encapsulating an electrical connector having upstanding side walls extending between opposite ends and internal passageways through the connector between said opposite ends, said housing having walls defining a socket with an unrestricted open end and smooth inner side surfaces having dimensions adapted to conform to the side walls of a said connector entirely around the connector and receive the connector endways with a sliding fit sufficiently close that the passageways in the connector will offer less resistance to movement of the encapsulating material than the space between the inner side surfaces of the socket and the connector walls, a pair of levers, and means for hingedly mounting said levers at the open end of the socket in opposing relationship, each lever having an end spaced a first distance from said hinge means and adapted for manual engagement and a driving surface adjacent the open end of the socket spaced a distance less than said first distance from said hinge means and adapted to engage the exposed end of a said connector received in the socket, and being manually pivotable via said hinge means from a first position at which the open end of the socket is unrestricted toward a second position to engage its driving surface with the exposed end of a said connector received in the socket and drive the connector fully within the socket.

2. A housing according to claim 1, further including means for latching said levers in their second positions.

3. A housing according to claim 1, wherein said housing walls and levers are a one piece molding of polypropylene, the levers being hingedly mounted on the housing walls by a relatively thin hinge section of the polypropylene.

4. A housing according to claim 1, wherein said socket has an elongate rectangular open end, and said levers are positioned along opposite sides of said open end.

5. A housing according to claim 1, wherein said socket has an elongate rectangular open end and said levers are attached to said housing walls along opposite ends of said open end.

6. A housing according to claim 5, wherein each of said levers includes a first portion hingedly mounted on said housing walls and including said driving surface, and a second portion defining said end adapted for manual engagement, the second portion being pivotally mounted on said first portion and having projections adapted to engage said first portion and move it with said second portion upon manual movement of said levers toward said second position, and wherein said housing includes means for latching said first portion in the second position.

7. A housing according to claim 6, wherein said housing walls and said levers are a one piece molding of polypropylene, said first portions being hingedly mounted on said housing walls and said second portions being pivotally mounted on said first portions by relatively thin hinge sections of the polypropylene, and said hinge sections between said first and second portions afford severing or tearing said second portion from said first portion upon latching of said first portion in the second position.

* * * * *

UNITED STATES PATENT AND TRADEMARK OFFICE
CERTIFICATE OF CORRECTION

PATENT NO. : 4,010,994
DATED : March 8, 1977
INVENTOR(S) : James E. Aysta

It is certified that error appears in the above-identified patent and that said Letters Patent are hereby corrected as shown below:

Column 1, line 12, after "as" insert -- in --.

Signed and Sealed this fifth Day of July 1977

[SEAL]

Attest:

RUTH C. MASON
Attesting Officer

C. MARSHALL DANN
Commissioner of Patents and Trademarks